United States Patent
Allen

(10) Patent No.: US 7,428,641 B2
(45) Date of Patent: *Sep. 23, 2008

(54) SESSION-STATE MANAGER

(75) Inventor: Joshua Allen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

This patent is subject to a terminal disclaimer.

(21) Appl. No.: 10/975,723

(22) Filed: Oct. 28, 2004

(65) Prior Publication Data
US 2005/0060548 A1 Mar. 17, 2005

Related U.S. Application Data

(63) Continuation of application No. 09/522,063, filed on Mar. 9, 2000, now Pat. No. 6,877,095.

(51) Int. Cl.
H04L 9/00 (2006.01)
H04K 1/00 (2006.01)
G06F 7/04 (2006.01)
G06F 17/30 (2006.01)

(52) U.S. Cl. .............. 713/182; 713/183; 713/184; 713/185; 726/3; 726/4; 726/5; 726/6; 726/7; 726/8; 726/9; 709/223; 709/224; 709/225; 709/226; 709/228

(58) Field of Classification Search ............ 713/182
See application file for complete search history.

(56) References Cited

U.S. PATENT DOCUMENTS

| | | | | |
|---|---|---|---|---|
| 5,491,752 A | * | 2/1996 | Kaufman et al. | 380/30 |
| 5,542,046 A | * | 7/1996 | Carlson et al. | 726/5 |
| 5,835,724 A | * | 11/1998 | Smith | 709/227 |
| 5,907,621 A | * | 5/1999 | Bachman et al. | 713/155 |
| 6,041,357 A | * | 3/2000 | Kunzelman et al. | 709/228 |
| 6,065,117 A | * | 5/2000 | White | 713/159 |
| 6,496,824 B1 | * | 12/2002 | Wilf | 707/10 |
| 6,877,095 B1 | * | 4/2005 | Allen | 713/182 |

* cited by examiner

Primary Examiner—Longbit Chai
(74) Attorney, Agent, or Firm—Lee & Hayes, PLLC

(57) ABSTRACT

Without actually storing session-state information, the described exemplary implementations of session-state manager identify a user, validate the user's current logon state, and determine whether the user's session should expire. User identification and logon validation are checked by a server in a stateless network by generating a mathematically session-state token and sending that token to a user. Subsequently, the server receives a mathematically session-state token from the user and checks that token. If that token checks out, then the user is allowed continuing access under the same session. If it doesn't check out, then the user may be forced to start a new session by logging-on again. Alternatively, the server may check to see if the token would check out if it had come at an earlier time block. The session-state tokens are mathematical encoded and are generated using a one-way encryption scheme. Such a one-way encrypted token is scientifically impossible to reverse-engineer. Furthermore, logon expiration is checked by the server using the same mathematically session-state token. The token is checked to determine whether a predetermined number of time blocks have past. If so, then the server will terminate the user's session.

6 Claims, 7 Drawing Sheets

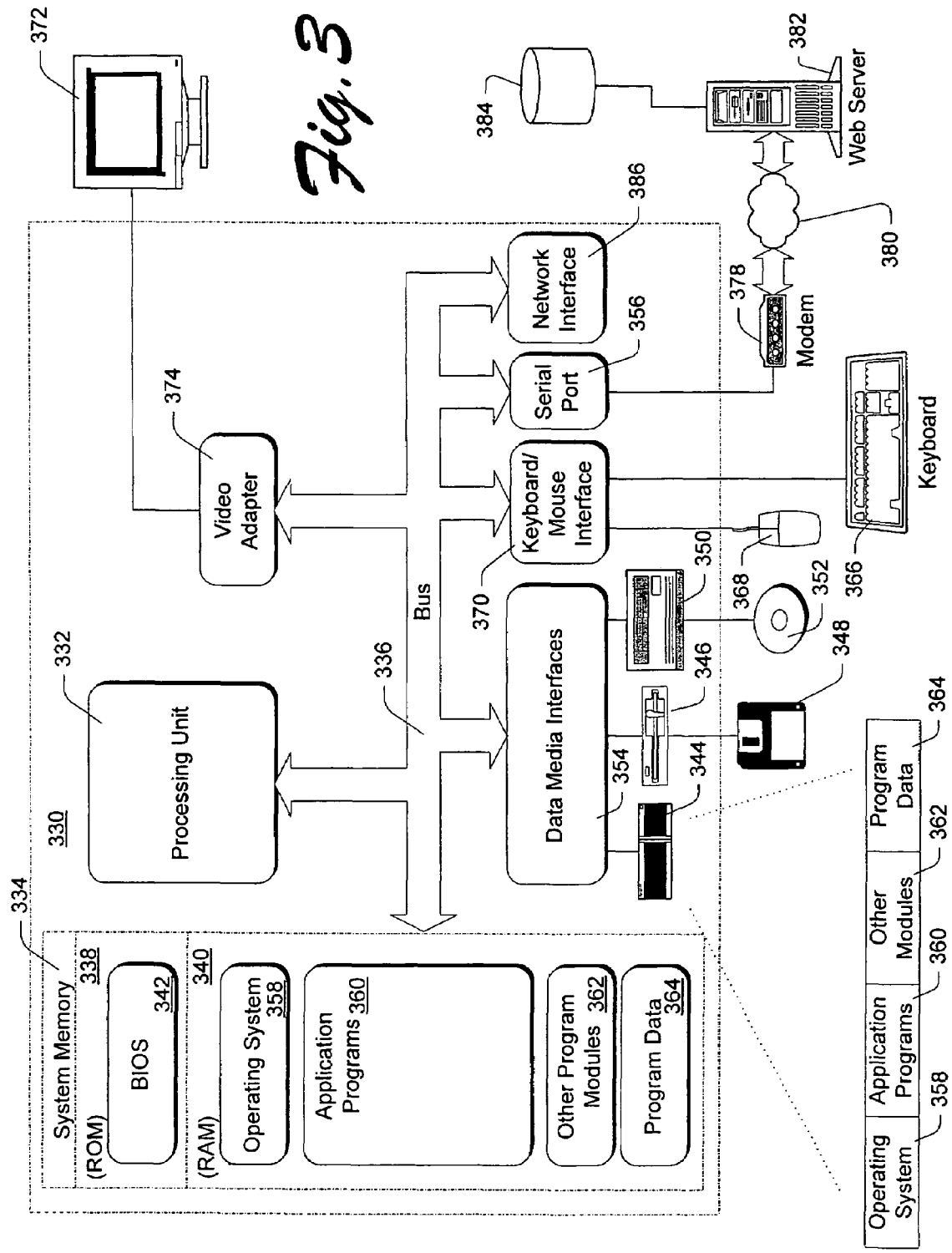

SESSION-STATE MANAGER

RELATED APPLICATIONS

This is a continuation of and claims priority to U.S. patent application Ser. No. 09/522,063, filed Mar. 9, 2000, entitled "Session-State Manager" by inventor Joshua Allen.

TECHNICAL FIELD

This session-state manager relates to tracking session-state information in a computer communications network environment.

BACKGROUND

The communications protocol used in a typical mainframe environment maintains state information about each user's session. A session is an active connection between two computers. For example, a user begins a session when the user logs into and is authorized by a mainframe computer from a workstation.

Communication between the user's workstation and the mainframe is maintained during the session. Every time the user communicates with the mainframe, the mainframe must confirm who the user is and whether the user is currently logged-on. The communications protocol used between the mainframe and the user's workstation facilitates this session-state tracking.

Identification, validation, and authorization are main reasons for tracking a user's session state information. The mainframe identifies the user.

If the identified user is already logged-on, the user is validated. It is not desirable to force a validated user to logon each time there is any communication. Other than being frustrating, this would be extremely inefficient. Once the user has been identified and the user's logon is validated, the mainframe manages her access to available resources.

Typically, users are not authorized to have access to all available resources. Instead, each user is given authorization to access a specific set of resources. Maintaining readily available session-state information makes it easy to identify, validate, and authorize users.

Part of the core problem with all of session-state management techniques is identifying the user. One way to identify the user is to employ the unique address of the client computer that the user is using. Another way is to use a unique user identification indicator (UserID). The unique UserID is a popular choice because it is personal, reliable, and portable. Using the "unique" address of a client computer is often not a desirable option because, depending on the exact network configuration, the address might not be personal, it might not always be unique, and might not be portable.

The universal session-state management issues include:
  User Identification—Who is the user, and is the user really who she claims to be?
  Logon Validation—Is the user currently logged on?
  Logon Expiration—How long has it been since last contact with the user?

Session-state information identifies the user and validates that the user is currently logged-on. Session-state information is tracked during a session.

A session begins when the user first contacts the server. User authentication is the first task in the session. Typically, a user provides a user name and a password. If the user name and password match accordingly in the authentication database, then a user begins a session and session-state tracking is initiated.

In addition to user identification and logon validation, it is often desirable to track the last time this particular user was active. The system may be programmed to automatically disconnect a user if there has been no activity for a specified time block. This is called "time-out" or "logon expiration."

Logon expiration is optional. However, most systems utilize some sort of session time-out tracking. This is particularly true in communications networks that employ communications protocols that do not inherently track session-state information. These networks are called "stateless" Most asynchronous communications networks are stateless.

Stateless networks have no mechanism for monitoring the state of a user's session. They can only gauge a user's desire to maintain a session by active communications from the user. A stateless network cannot determine if the user has turned off their computer and gone home for the day. In other words, a user of a stateless network can discontinue use without "logging-off."

Time-out is the mechanism utilized to automatically "log-off" a user after a given period of inactivity. Typically, a user-associated record is kept that indicates the last time there was contact from the user. If the "time-out" time block passes between user activities, then the user is timed-out. If she returns, the user is forced to logon again.

Reasons for session time-out include security and releasing of resources. The time-out feature adds security by making it less likely for someone to impersonate another by using the other's computer. Session timeout also facilitates the release of resources allocated to the user during their session so that such resources can be used by others.

Other user-related information can be tracked as session-state information, such as the contents of an electronic "shopping cart," purchase history, personalization factors, and the like. However, these are not as vital for security and identification as are the universal session-state management issues.

Limited-access sites on the World Wide Web ("Web") have introduced the need for tracking session states over the Internet. This is particularly true in the realm of Internet commerce, which is also called "e-commerce", "e-business", "on-line business", "Web-business", and the like. It is vitally important that an e-business Web site have a reliable mechanism in place for users to establish and maintain a session.

However, the communications protocol that is typically used with the Web is stateless. Standard Web protocols (such as Hyper Text Transfer Protocol "HTTP") can be thought of as a request/response pair. That is, a client or user makes a request that is filled by a server. After the request/response is complete, a Web server, cannot tell if a user intends to make further requests. Thus, in secure sites, a server cannot tell if a user is still logged in; has moved on to other sites, or has turned off the computer and gone home.

In stateless protocols, with each communication, the Web server must check on the state of the user's session. Since the protocol does not assist with this, techniques have been developed to accomplish session-state checks. These techniques typically involve saving state information somewhere and examining that information with each exchange.

FIG. 1 shows an example of a typical e-commerce network configuration 100. In order to track the session state information of the user, a typical Internet configuration includes three session-state storage tiers 102, 104, and 106. At 102, session-state storage tier 1 includes a client 110. The client 110 is a computer (such as a laptop, desktop, or special purpose Internet device) that is capable of running a Web browser. An example of a Web browser is "Internet Explorer" from Microsoft Corporation. The client 110 is connected via its Internet Service Provider (ISP) 112 to the Internet 114.

At 104, session-state storage tier B includes one or more Web servers 120 connected to the Internet 114. At 106, session-state storage tier C includes a Web database 130 connected to the Web servers 120. Session-state information can be stored at any one of, or any combination of, these three tiers. Each option or combination of options has drawbacks and limitations, such as scalability, reliability, resource efficiency, loss of centralized control, and security.

Tier A (Storing on the client): The Web server 120 may pass session state information to the client 110 for the client to store locally. The information is stored within tier A. Each time the client sends info to the Web server, it passes along the stored session-state information. The server updates the information and passes it back to the client. This exchange can be accomplished using hidden form fields, universal resource locators (URLs), cookies, or other similar techniques. Those who are skilled in the art are familiar with the available techniques to exchange administrative information between a Web server and a Web browser.

The disadvantages of storing session-state information at Tier A include: lack of speed, inefficiency, unreliability, and lack of security. This technique generates a large amount of administrative data that is flowing back and forth with each communication. In addition, the Web browser must send all session data on each request to enable the Web server to get the session-state information. This reduces the effective communications speed and efficiency.

This technique is unreliable and unsecure because the user's session-state information is stored outside of the control of the Web server. Since it is stored with the client, the Web server must trust the information that it receives. However, the information that the server receives can be accidentally incorrect (because of data corruption on the client) or it can be purposefully incorrect (because of an attempted security violation).

To avoid security disasters where users masquerade as other users, many of it these Tier A techniques encrypt the session-state information. To be more specific, they use two-way encryption schemes, which are schemes where encrypted information can be easily recovered by decryption. A server encrypts session-state information and passes it to the browser. The browser stores it and returns it to the server upon subsequent communications, where it is decrypted, used, and updated by the server before being re-encrypted and returned to the client. This again adds to the overhead and inefficiency.

Although encryption makes a security attack less likely, it does not eliminate it. Since these techniques require the use of two-way encryption, the browser-stored, session-state information can be decrypted. The door may be locked, but it is not sealed.

Tier B (Storing on the Web server): To eliminate the need to encrypt and decrypt the session-state information with each request, the Web server 120 may simply store all session-state information at the Web server itself. The information is stored within Tier B 104. This is the easiest session-state information storage solution.

The major drawback to this technique is scalability. E-commerce Web sites are generally hosted by a family of Web servers that work together to balance the load. This balance is accomplished by gatekeepers called "load balancers." This family of Web servers with a load balancer is often referred to as a "Web farm."

Load balancers typically work by passing an incoming request to any server that is available to process it. Thus, different Web servers in the farm may service subsequent requests from the same user.

If session-state information stored at Tier B (on the Web servers), then each server must have access to the session-state information of each currently logged-in user. This is because any server may receive a request from any server at any time. Therefore, the servers must be able to communicate with each other and share session-state information.

With session-state information storage in Tier B, each server must maintain a copy of session-state information for all users. Alternatively, groups of servers can service designated groups of users. Therefore, all servers within a given group must maintain a copy of the session-state information for their designed users.

The copies of the users' session-state information are updated whenever that information changes. This communication overhead and storage of redundant information is inefficient. These inefficiencies are not terribly great when dealing with one or two Web servers. However, this overhead can severely impact the performance of a Web site when a Web farm includes more than a few servers. Therefore, this technique fails as the scale increases.

Tier C (Storing on the Web database): To overcome the inefficiencies of a Tier B solution, a central database may be to store information once. The Web database 130 stores all session-state information for all of the Web servers of the farm to access as needed.

Using a centralized database ameliorates the scalability problem, but it does not eliminate it. In order to handle increases in workload, the Web database must grow with the Web farm to support the management of additional session-state information of new users.

Presently, storing session-state information in Tier C (on the Web database 130) is the most common approach to solving the problems of tracking users' session-state information over the Web. FIG. 1 shows an example of this approach. The Web database 130 stores a user's universal session-state information in block 140. This block 140 includes "user identification" 142, "current logon status" 144, and "time of last contact" 146.

Available Tier C techniques of tracking session-state information in Web farms rely on either database-based sessions, queries against a LDAP (Lightweight Directory Access Protocol) service, or an in-memory session state. All of these back-end services running on a Web database will bottleneck as more servers are added to the farm in order to scale. The database or LDAP services on the backend will need to be scaled as the servers scale, and can become very expensive and complex to maintain. Additionally, the request from each Web server to a Tier C service introduces latency and delays to the response to a user's request.

Although session-state management techniques exist for use over stateless communications networks (such as the Web), each has drawbacks and limitations. Many address the universal session-state issues of user identification, logon validation, and timeout. A common characteristic of the popular techniques is storing the session-state information at one or more of three tiers (102, 104, and 106 of FIG. 1). Storing session-state information at any of the tiers impacts scalability, speed, efficiency, reliability, or security.

SUMMARY

The exemplary implementations of session-state manager described herein overcome the limitations of the existing session-state management techniques for stateless networks. One way that this is accomplished is by not storing the session-state information on any tier. Another way is by having a common time tracker to manage session timeouts. Still another way is to use one-way encryption schemes to provide superior security.

Without actually storing session-state information, the described exemplary implementations of session-state manager identify a user, validate the user's current logon state, and determine whether the user's session should expire.

User identification and logon validation are checked by a server in a stateless network by generating a mathematically session-state token and sending that token to a user. Subsequently, the server receives a mathematically session-state token from the user and checks that token. If that token checks out, then the user is allowed continuing access under the same session.

If it doesn't check out, then the user may be forced to start a new session by logging-on again. Alternatively, the server may check to see if the token would check out if it had come at an earlier time block. The session-state tokens are mathematical encoded and are generated using a one-way encryption scheme. Such a one-way encrypted token is scientifically impossible to reverse-engineer.

Furthermore, logon expiration is checked by the server using the same mathematically session-state token. The token is checked to determine whether a predetermined number of time blocks have past. If so, then the server will terminate the user's session.

Since the described exemplary implementations of session-state manager uses a mathematical function on each server to determine user identification and logon validity/expiration, it will easily scale as the number of servers in a group of servers ("farm") scale. It also maintains users' session-state information across all servers in a farm without requiring communication between the servers or persisting the session information in memory, a database, or any other server-side store. This allows virtually unlimited scalability without having to build back-end authentication services.

BRIEF DESCRIPTION OF THE DRAWINGS

A more complete understanding of exemplary methods and arrangements of the present session-state manager may be had by reference to the following detailed description when taken in conjunction with the accompanying drawings wherein:

FIG. 3 is schematic drawing showing an exemplary computer that may be used in an implementation of the session-state manager;

DETAILED DESCRIPTION

The following description sets forth a specific embodiment of a session-state manager that incorporates elements recited in the appended claims. This embodiment is described with specificity in order to meet statutory enablement and best-mode requirements. However, the description itself is not intended to limit the scope of this patent. Rather, the inventor has contemplated that the claimed session-state manager might also be embodied in other ways, in conjunction with other present or future technologies.

The exemplary session-state manager implementation is does not store a user's actual session-state information on any tier in a stateless network. Rather a Web server creates and delivers a one-way encrypted token to a user on a client of that server. Rather than including session-state information, the token incorporates a representation or a digest of the user's session-state information.

The server generates a token and sends it to the user. Subsequently, the user sends the token that it received to the server. The server checks out the received token to see if the user has a valid session. The server may update the tokens from time to time.

The exemplary session-state manager is implemented on a server on the World Wide Web ("Web"). The Web server hosts an access-restricted Web site. Since the Web is stateless, the Web protocol does not help track session-state information.

Part of the core problem with all of session-state management techniques is identifying the user. One way to identify the user is to use the unique address of the client computer that the user is using. Another way is to use a unique user identification indicator (UserID).

Some computers now access the Internet via devices called proxies. These proxies provide a single Internet Protocol ("IP") address for multiple users.

Figure 2:
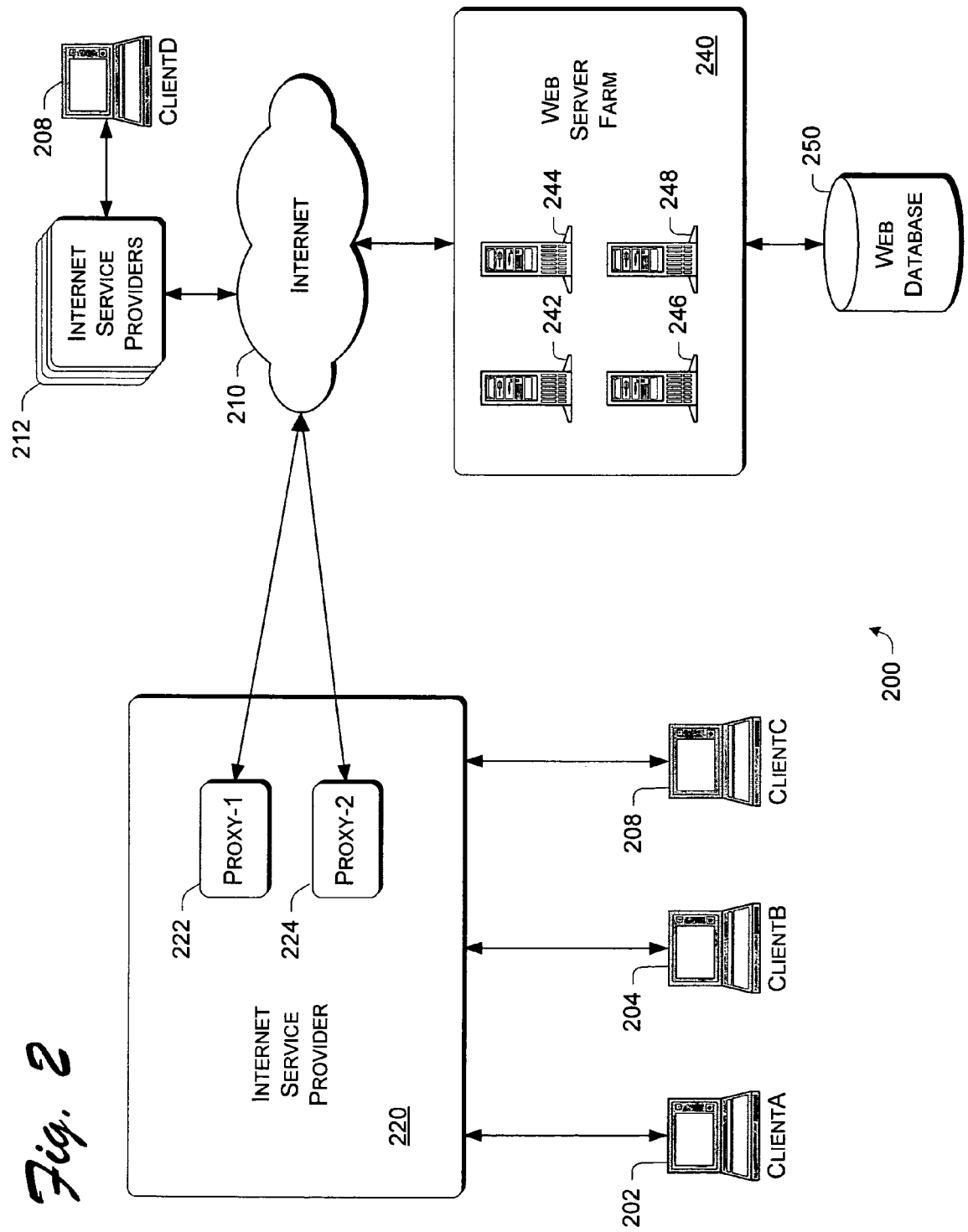
FIG. 2 is schematic drawing showing a communications network that may be used in an implementation of the session-state manager.

FIG. 2 shows a representation of a communications network 200 such as the Internet. The network includes clientA 202, clientB 204, clientC 206, and clientD 208. These clients are any computer that can connect to the Internet. For example, a client may be a special purpose Internet device, or any type of computer such as a desktop PC, a laptop, a palmtop, a Macintosh, or some other computer running a Web browser.

ClientD 208 connects to the Internet 210 through an Internet Service Provider (ISP) 212. When clientD connects through ISP 212, the ISP assigns clientD its own unique IP address. ClientD may be identified by that IP address. ISP 212 represents one or more ISPs.

ClientsA-C connect to the Internet 210 via ISP 220. ClientA 202 and ClientB 204 use "Internet Explorer" by the Microsoft Corporation as its Web browser. ClientC 206 uses some other Web browser.

ISP 220 may provide multiple paths to the Internet 210. Many large ISP no longer assign IP addresses to clients. Rather, they use a set of Internet proxies, such as proxy-1 222 and proxy-2 224. Proxies have their own unique IP address.

As their name implies, they act as an IP address proxy for the clients. Each time a communications comes from a client, it may use a different proxy. Thus, it will use a different IP address each time.

Communications over the Internet 210 to/from ClientsA-C may use a different proxy each time. For example, client A may use proxy-1 222 one time. The next time, it might use proxy-2 224.

A popular alternative is to have the user identify herself by an identifier of some kind (UserID). This may be called "user name", "user-id", "shopper name", "shopper-id", and the like.

FIG. 2 shows a typical site that a user might logon using a UserID. A Web farm 240 includes a multitude of separate Web servers, such as Web servers 242, 244, 246, and 248. One or all of these Web servers implement the exemplary session-state manager.

Scalability is a major advantage of a Web farm. As a site becomes more popular, additional Web servers can be added to the farm to support the additional load. A Web farm typically includes a Web database 250. These databases include central information that is shared by all of the Web servers.

Figure 1:
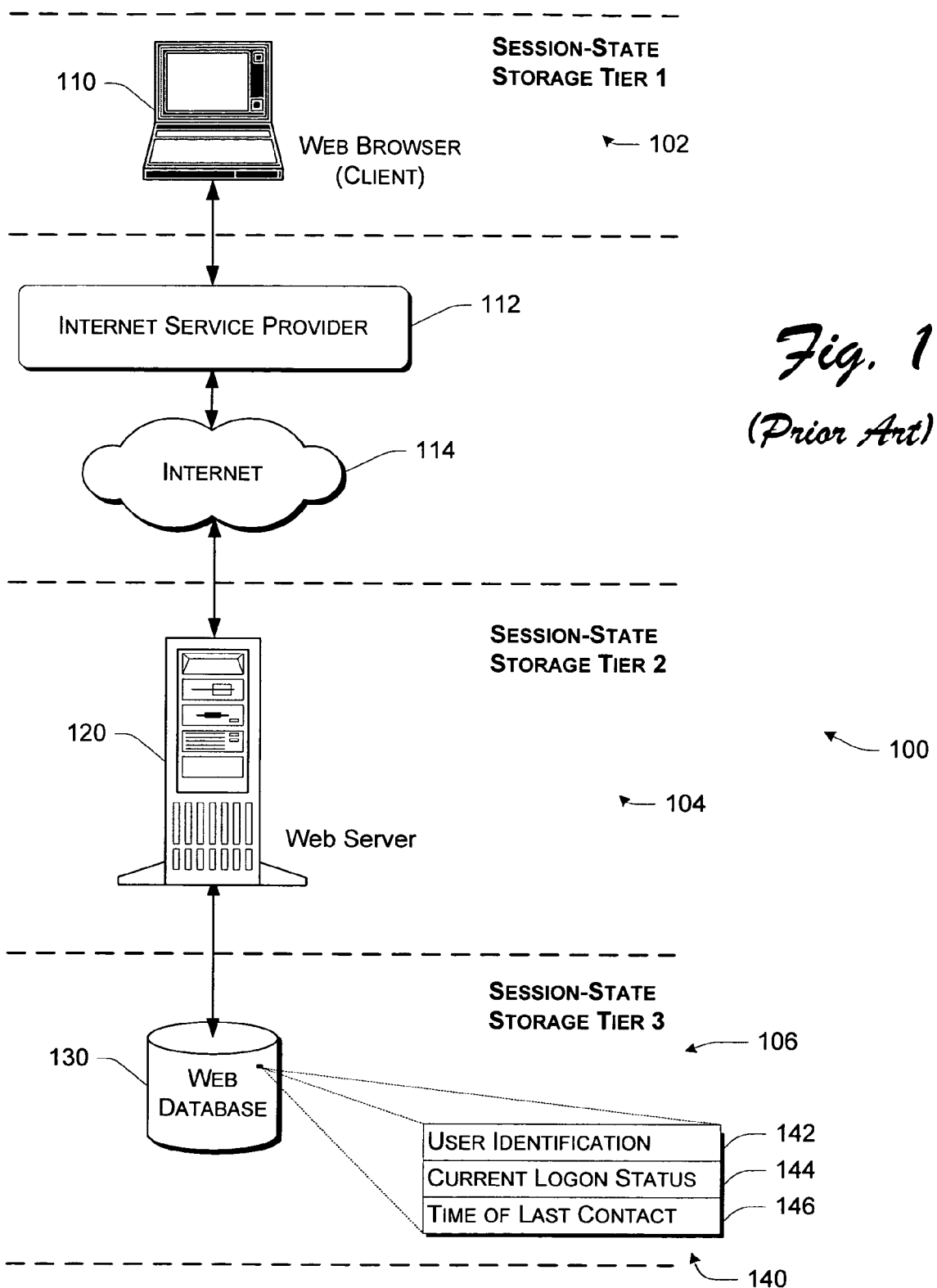
FIG. 1 is schematic drawing showing the three session-state storage tiers in which session-state information may be stored.

In the exemplary implementation of the session-state manager, session-state tokens are generated by the Web server. The Web server can be a single Web server as shown at 130 in FIG. 1 or a Web farm as shown at 240 of FIG. 2. These tokens are passed between the clients and the Web server. Examples of such client are shown at 110 in FIG. 1 and at 202-208 of FIG. 2. Preferably, these tokens are mathematically encoded and are generated by a one-way encryption scheme.

The tokens are encoded by including a value that is mathematically determined. Alternatively, the tokens are encoded by including a value representing another value. For example, the token may be encoded by concatenating several binary values or the token may be encoded by including a value representing an entry into a look-up table. The tokens may be encrypted by including a hash value that is generated by a one-way encryption hash.

The exemplary embodiment of the session-state manager is be integrated into the operation of a Web server. For example, the exemplary embodiment uses one or more COM (Component Object Model) components called from within dynamic pages such as ASP (Active Server Page).

Alternatively, an embodiment of the session-state manager may be implemented as a stream filter, such as ISAPI (Internet Server Application Programming Interface), of the Web server. This stream filter can automatically implement the session-state information functions with no programming or modification to existing Web pages required.

Other types of Web servers may have different mechanisms for providing specific functionality extension through plug-ins, snap-ins, or the like. The embodiments of the session-state manager may be implemented using these extension mechanisms, or may be directly incorporated into a component of the Web server.

FIG. 3 shows a computer that is an example of a computer that may be used with an implementation of the session-state manager. This computer may be a client, a Web server, a Web database, or any computer with a communications network (such as the Internet).

As shown in FIG. 3, computer 330 includes one or more processors or processing units 332, a system memory 334, and a bus 336 that couples various system components including the system memory 334 to processors 332. Bus 336 represents one or more of any of several types of bus structures, including a memory bus or memory controller, a peripheral bus, an accelerated graphics port, and a processor or local bus using any of a variety of bus architectures.

The system memory includes read only memory (ROM) 42 and random access memory (RAM) 340. A basic input/output system (BIOS) 342, containing the basic routines that help to transfer information between elements within computer 330, such as during start-up, is stored in ROM 338.

Computer 330 further includes a hard disk drive 344 for reading from and writing to a hard disk, not shown, a magnetic disk drive 346 for reading from and writing to a removable magnetic disk 348, and an optical disk drive 350 for reading from or writing to a removable optical disk 352 such as a CD ROM, DVD ROM or other optical media. The hard disk drive 344, magnetic disk drive 346 and optical disk drive 350 are each connected to bus 336 by one or more interfaces 354.

The drives and their associated computer-readable media provide nonvolatile storage of computer readable instructions, data structures, program modules and other data for computer 330. Although the exemplary environment described herein employs a hard disk, a removable magnetic disk 348 and a removable optical disk 352, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 348, optical disk 352, ROM 338, or RAM 340, including an operating system 358, one or more application programs 360 (such as a Web browser), other program modules 362, and program data 364. A user may enter commands and information into computer 330 through input devices such as keyboard 366 and pointing device 368. Other input devices (not shown) may include a microphone, joystick, game pad, satellite dish, scanner, or the like. These and other input devices are connected to the processing unit 332 through an interface 370 that is coupled to bus 336.

A monitor 372 or other type of display device is also connected to bus 336 via an interface, such as a video adapter 374. In addition to the monitor, personal computers typically include other peripheral output devices (not shown) such as speakers and printers.

Computer 330 can operate in a networked environment using logical connections to one or more remote computers, such as a Web server 382. Web server 382 typically includes many or all of the elements described above relative to computer 330. In addition, a Web database 384 may be connected to the Web server 382.

A logical connection that is not depicted in FIG. 3 is a local area network (LAN) via network interface 386 and a general wide area network (WAN) via a modem 378. Such networking environments are commonplace in offices, enterprise-wide computer networks, intranets, and the Internet.

Depicted in FIG. 3, is a specific implementation of a WAN via the Internet. Over the Internet, computer 330 typically includes a modem 378 or other means for establishing communications over the Internet 380. Modem 378, which may be internal or external, is connected to bus 336 via interface 356.

In a networked environment, program modules depicted relative to the personal computer 330, or portions thereof, may be stored in the remote memory storage device. It will be appreciated that the network connections shown and described are exemplary and other means of establishing a communications link between the computers may be used.

Tokens

The exemplary implementation of the session-state manager uses session-state tokens, rather than storing session-state information. These tokens are generated by a Web server and sent to a user. These tokens are subsequently received from the user and examined by the server.

These tokens are used to identify a user, validate the user's session, and expire the user's sessions. These tokens are created by using information that is traditionally tracked to monitor users' session state. Unlike conventional session-state management where session-state information is stored, the tokens provide advantages in scalability, speed, efficiency, reliability, or security.

In the exemplary implementation of the session-state manager, the manager generates tokens based upon specific information and compares the just-generated tokens with tokens received from a user. The exemplary implementation of the token generation function, referred to herein as the GetToken( ) pseudocode, creates a token using specific information. The exemplary implementation of the token comparison function, referred to herein as the CheckToken( ) pseudocode, takes a received token and compares it to a freshly generated token to see if they match.

Time Buckets

The exemplary implementation of the session-state manager uses a common timeout-tracking scheme to expire sessions after sufficient time has passed. In this exemplary implementation, time is divided into discrete intervals called "time buckets" or simply "buckets." These time buckets form a quantized time measurement that can be tracked and identified simply by assigning a running count. A Web server (such as Web server 130 in FIG. 1 or the Web servers of Web farm 240 of FIG. 2) keeps a running count of these time buckets.

Figure 4:
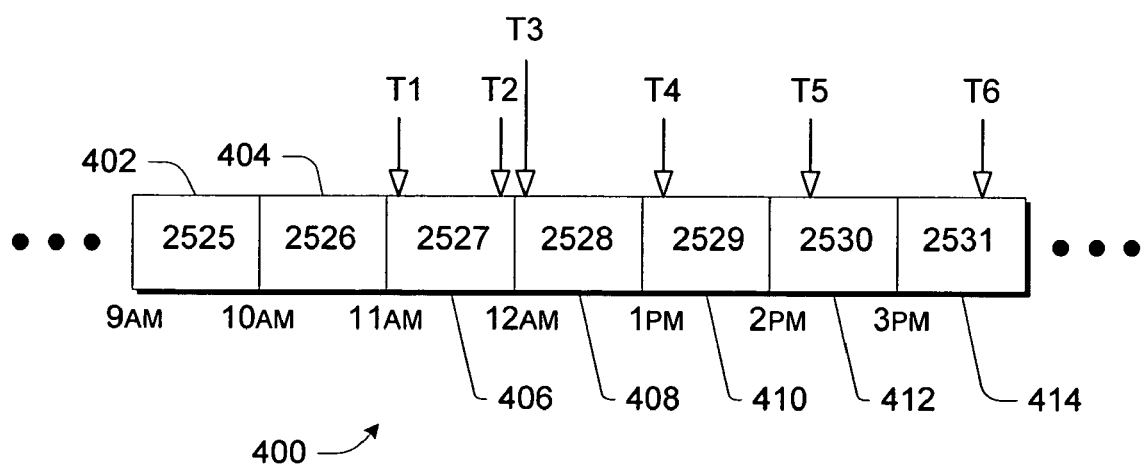
FIG. 4 is a timeline showing incremental blocks of time that represents examples of time blocks that may be used with an exemplary implementation of the session-state manager.

FIG. 4 shows an incremental series of buckets at 400. In this exemplary series of buckets, each bucket is one hour long. Of course, the exact length of each bucket is an implementation detail that can be varied based upon the needs of each implementation. Assuming a fixed number of buckets before timeout occurs, the shorter buckets will lead to a shorter timeout period and the longer buckets will lead to longer timeout period.

It is assumed for the example shown in FIG. 4 and for the exemplary implementation described in this document that all of the buckets are of equal length. It is possible for the buckets to have variable lengths. However, if that is the case, then it is preferred for there to be a way so that a bucket's length can be quickly determined.

In FIG. 4, the first bucket shown is bucket 402, which begins at 9 am and ends at 10 am. Within a Web server, bucket 402 is identified by a simple ordinal value such as 2,525. FIG. 4 shows other buckets 404-414 with incremental ordinal values 2,526 through 2,531. These ordinal values may be used to identify a time bucket. They may be referred to as "TimeIDs."

Incremental buckets before bucket 402 are not shown. Likewise, incremental buckets after bucket 414 are not shown.

It is assumed for the example shown in FIG. 4 and for the exemplary implementation described in this document that the value assigned to each bucket is a simple ordinal value. It is possible for the bucket values (or identifications) to be determined in other ways. However, if that is the case, then there must be a way to identify a bucket's value.

In the exemplary embodiment of the session-state manager uses time buckets as shown in FIG. 4 as part of the input to create tokens. This results in a situation where the token that is generated depends on the time bucket when the token is created. When the time bucket changes, a different token will be created. As explained in create detail below, this can be used to test for logon expiration.

Suppose the exemplary session-state manager called GetToken( ) at T1 in the time bucket 406 in FIG. 4. At T2, suppose the exemplary session-state manager calls CheckToken( ) to see if a particular token is still valid. Because the bucket is still bucket 406, the same token is returned (assuming that no other changes have occurred in the information used to generated the token). T3 is within a new time bucket 408. Therefore, a new token is returned from CheckToken( ). This new token is used in subsequent calls to CheckToken( ).

A session times out after X number of full buckets. X is a specified number of one or more. Of course, the exact value for X is an implementation detail that can be varied based upon the needs of each implementation.

Because a time bucket change will trigger a token change, activities during any point during a bucket are treated equally. For example, in FIG. 4 the buckets are one hour long. Activity at T1 takes place at 11:01 am. Activity at T2 takes place at 11:59 am. Activity at T3 takes place at 12:01 pm.

T1 and T2 activities are fifty-eight minutes apart but would generate the same token (assuming no other changes) because they are within the same bucket. T2 and T3 activities are two minutes apart, but would generated different tokens (assuming no other changes) because they are in different buckets. Therefore, the specified length of the buckets should be adjusted so that it meets the needs of the users and of the Web site.

The effect of quantized time buckets on the length of time that a user can have a valid session without timing out falls within a range that can be mathematically determined. Assuming X is the number of buckets specified for the timeout value, $T_b$ is the length of a time bucket, Y is approximately the smallest measurable moment of time relative to the length of the time bucket.

The minimum time that a user can have session before a timeout (MinTO) may be calculated using the following formula:

$$\text{MinTO} = (X+Y)T_b$$

The maximum time that a user can have a session before a timeout (MaxTO) can be calculated using the following formula:

$$\text{MaxTO} = (2X-Y)T_b$$

Token Generation

Figure 5:
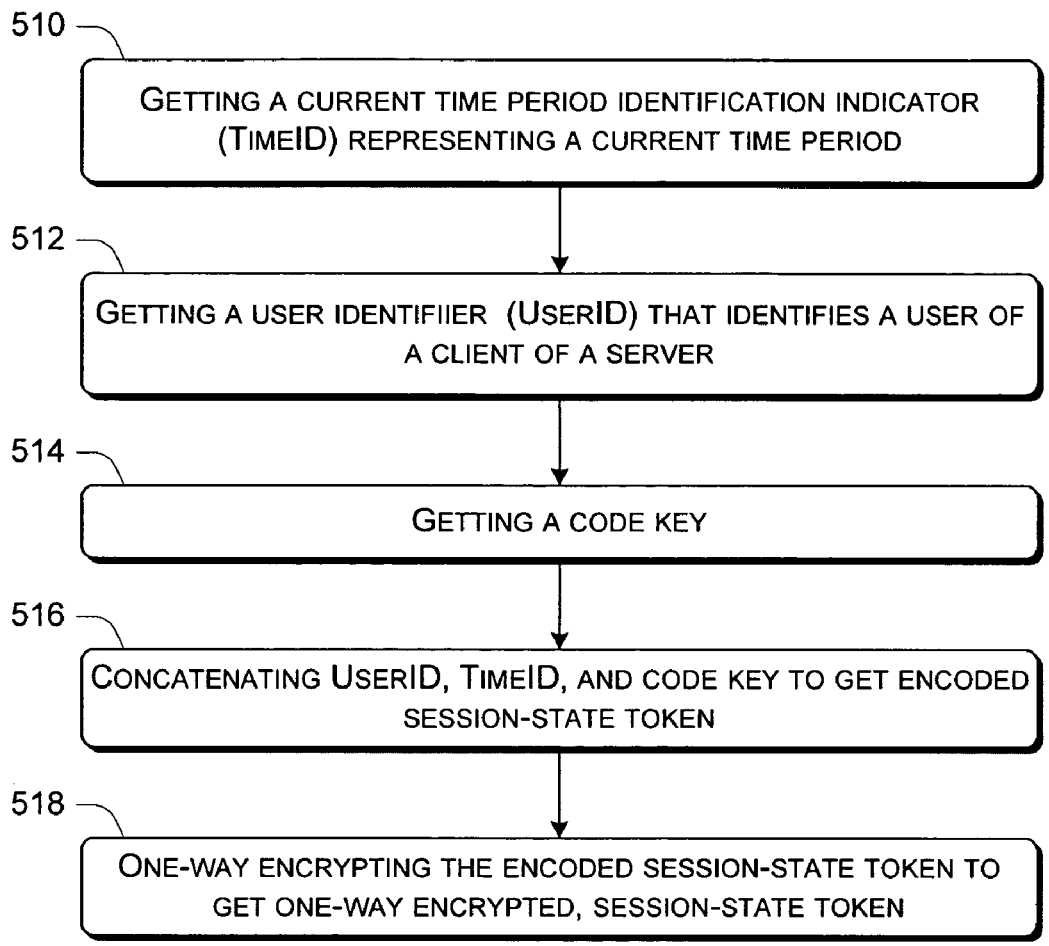
FIG. 5 is a flowchart showing exemplary steps implementing the session-state manager.

FIG. 5 shows the steps of the exemplary implementation of the session-state manager that may be broadly called "token generation." At 510, the Web server gets a current time bucket identification indicator (TimeID) that represents a current time bucket.

At 512, the Web server gets the user's UserID that identifies the user of the client. This UserID may have been supplied by the user or is may be retrieved from a database. The UserID may or may not be equivalent to the "username" used for logon authentication.

At 514, the Web server gets a code key (i.e., "secret string" or "trapdoor key"). This code key is defined data that will be used with the TimeID and the UserID so that it is more difficult to decode the encoded token and determine and what the TimeID and UserID. This code key may be statically or dynamically designated. If the code key is dynamically designated, it is preferable that code key be tracked carefully so that compared tokens are based upon the same code key.

At 516, the Web server combines the UserID, TimeID and the code key to get the encoded session-state token. In the exemplary implementation, the combining is accomplished by concatenating the UserID, TimeID and the code key. At 518, the Web server encrypts the encoded session-state token to produce an encrypted, session-state token. The encryption preferable uses a one-way encryption scheme, such as a MD5 hash. The session-state token is N bits of the result of the cryptographic hash.

Assuming that $T_{encoded}$ is the encoded token; UserID is the identifying name of a user; TimeID is a time bucket identifier; and code key is defined data (such as a text string), the generation of the encoded token of the exemplary embodiment may be represented by this formula:

$$T_{encoded} = UserID + TimeID + code\ key$$

Assuming that $T_{encrypted}$ is the encrypted token; N[]is a function the takes a given number of bits; and H[]is a cryptographic hash function, the generation of the encrypted token of the exemplary embodiment may be represented by this formula:

$$T_{encrypted} = N[H[T_{encoded}]]$$

In the $T_{encoded}$ formula, the UserID, TimeID and code key are concatenated (or otherwise combined). In the $T_{encrpted}$ formula, the cryptographic hash (like MD5) of $T_{encoded}$ is performed and N bits of the resulting hash are taken at the encrypted token.

In the exemplary embodiment of the session-state manager, a function called GetToken( ) is used to generate a token. The calling program passes it something preferably unique (e.g., UserID) as an input. GetToken returns an encrypted token, which is unique to the input and can be used to determine what time the user logged in.

An exemplary section pseudocode for the GetToken function is below (the pseudocode is similar to C++ code for a COM implementation):

```
STDMETHODIMP CSessMan::GetToken(BSTR root,
BSTR *pbstrToken)
{
    HRESULT hr;
    CComBSTR tmpRoot(root);
    tmpRoot.Append("");
    if (tmpRoot.Length( ) == 0) {
        CComVariant vtOut("Timeout");
        hr = VariantChangeType(&vtOut, &vtOut, 0, VT_BSTR);
        if (FAILED(hr)) return hr;
        *pbstrToken = ::SysAllocString(V_BSTR(&vtOut));
        return S_OK;
    }
    char tmpOut[33];
    tmpRoot.Append(m_szSecretSeed);
    tmpRoot.Append(GetTimeBucket( ));
    CalcHash((char *)tmpRoot.m_str , tmpOut,
((int)(tmpRoot.Length( )) + 1) * 2);
    tmpOut[m_HashLength] = 0;
    CComVariant vtOut(tmpOut);
    hr = VariantChangeType(&vtOut, &vtOut, 0, VT_BSTR);
    if (FAILED(hr)) return hr;
    *pbstrToken = ::SysAllocString(V_BSTR(&vtOut));
    return S_OK;
}
```

Encryption Schemes

Two-way encryption schemes are those where the encrypted data can be decrypted. Although there are many different two-way encryption schemes with varying levels of security, all of them allow the encrypted data to be decrypted. Two-way encryption schemes provide a locked door behind which data may be stored. However, that door has a key. If that key falls into the wrong hands, it can be unlocked and the data stored behind the door stolen.

One-way encryption schemes are those where the encrypted data cannot be decrypted. *Applied Cryptography* by Bruce Schneier (John Wiley & Sons, Inc., 1994) (p. 27) describes a one-way encryption scheme as one that is "relatively easy to compute but significantly harder to undo or reverse." It also says that that "hard" means "it would take millions of years to compute . . . . " In general, One-way encryption schemes are far more secure than two-way encryption schemes.

Examples of one-encryption schemes that may be used with the exemplary implementation of the session-state manager include a 128-bit MD5 hash, Secure Hash Algorithm (SHA), or any other cryptographically strong one-way hash function. The preferred one-way encryption scheme is fast and produces results that are apparently randomly distributed.

Using a one-way encryption hash (like MD5), the session-state token is naturally statistically distributed. This makes it practically impossible for a potential interloper to guess a valid token. The security level can be increased or decreased by changing the strength of the encryption scheme.

The security level may be further increased or decreased by selecting the number of bits used from the returned hash. For example, with a 128-bit MD5 hash, using only 80 of the returned bits, there is a less than one in one trillion (1 in 1,000,000,000,000) probability of the token being correctly guessed. In this exemplary embodiment, only about ten bytes of data are exchanged between the client and server for tracking of session-state information.

Since the session-state manager uses a one-way encryption hash that is controlled by the server, it is scientifically impossible for a potential interloper to discover the UserID, TimeID and the code key by "cracking" the encrypted token. In addition, it is also practically impossible for a potential interloper to fake client-side information to obtain access to a valid session.

Token Initialization

Figure 6:
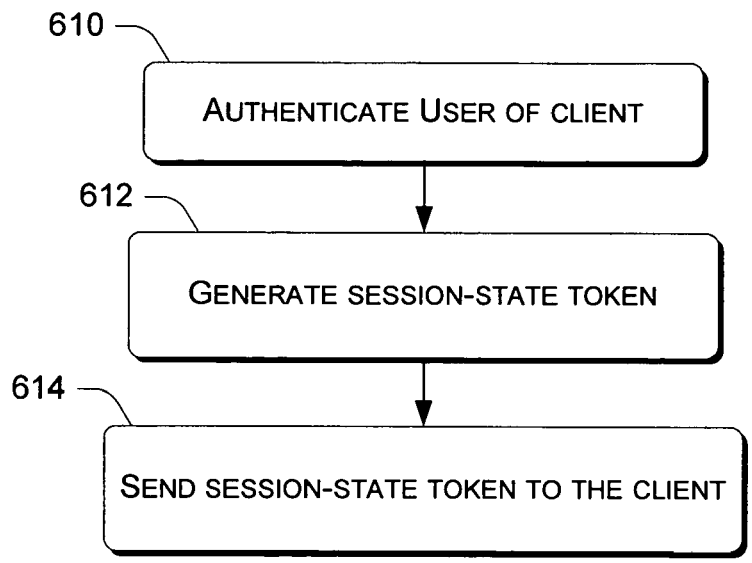
FIG. 6 is a flowchart showing exemplary steps implementing the session-state manager.

FIG. 6 shows the steps of the exemplary implementation of the session-state manager that may be broadly called "token initialization." At 610, a user of a client is authenticated. Typically, a user is asked for her "username" and password at the logon page of the Web site. The user provides the requested information. The authentication server(s) processes the information. The authentication server(s) will allows access or it will deny access.

If the user is authenticated and allowed access, an encoded, session-state token is generated by the Web server at 612. This encoded token does not include session state information. Rather, it incorporates representations of the session-state information.

In the exemplary implementation, the token is a code that refers (i.e., points) to an entry into a hash. The token itself does not include the inputs that were used in the one-way encryption hash scheme to generate the resulting code that pointed to the same place in the hash.

Alternatively, token may be unencrypted. In other words, the token may be plain text or plain data. However, this plain data may be encoded so that its meaning is not obvious absent additional information. For example, the encoded token may be a plain data reference to a look-up table.

A key difference between using an encrypted token and using an unencrypted token is that the latter lends to a discernable pattern due to the look-up table assignments as opposed to the apparently random distribution of the hash scheme. Thus, the look-up table implementation is less secure.

At 614, the token is sent to the client. The client briefly stores this token. Although the client is storing the token, it is not storing session-state information. Again, the token does not include session-state information. Rather, it incorporates representations of session-state information.

When the client makes a request, the client sends that token to the Web server. The data stored on the client is much smaller than with existing techniques that store actual session-state information on Tier A. In this exemplary embodiment, only about ten bytes of are stored on the client.

In the exemplary embodiment of the session-state manager, a user logs onto a Web site. The user must be authenticated.

The pseudocode below shows how a secure Web page on a web site may authenticates a user employing the steps described above and in FIG. 6:

```
' put the following code at the top of the page, before any output
Set logintoken = token from QueryString
Set crypto = Application("CryptoObj")
' previously set to "Orca.Crypto"
set querystring token=crypto.CheckToken(shopperId, logintoken)
if token = "Timeout" then
        Response.Redirect "login.asp"
    End if
End if
```

If the user first logs in successfully, a token generation function executes. The logon page calls a token generation function called "GetToken( )" and passes the function something preferably unique (e.g., the UserID provided by the user) as an input. GetToken returns an encrypted token, which is unique to the input and can be used to determine what time the user logged in.

This token is stored by passing around in the URL. The token could alternately be stored in a client-side cookie, a hidden form field, or the like.

Token Verification

Figure 7:
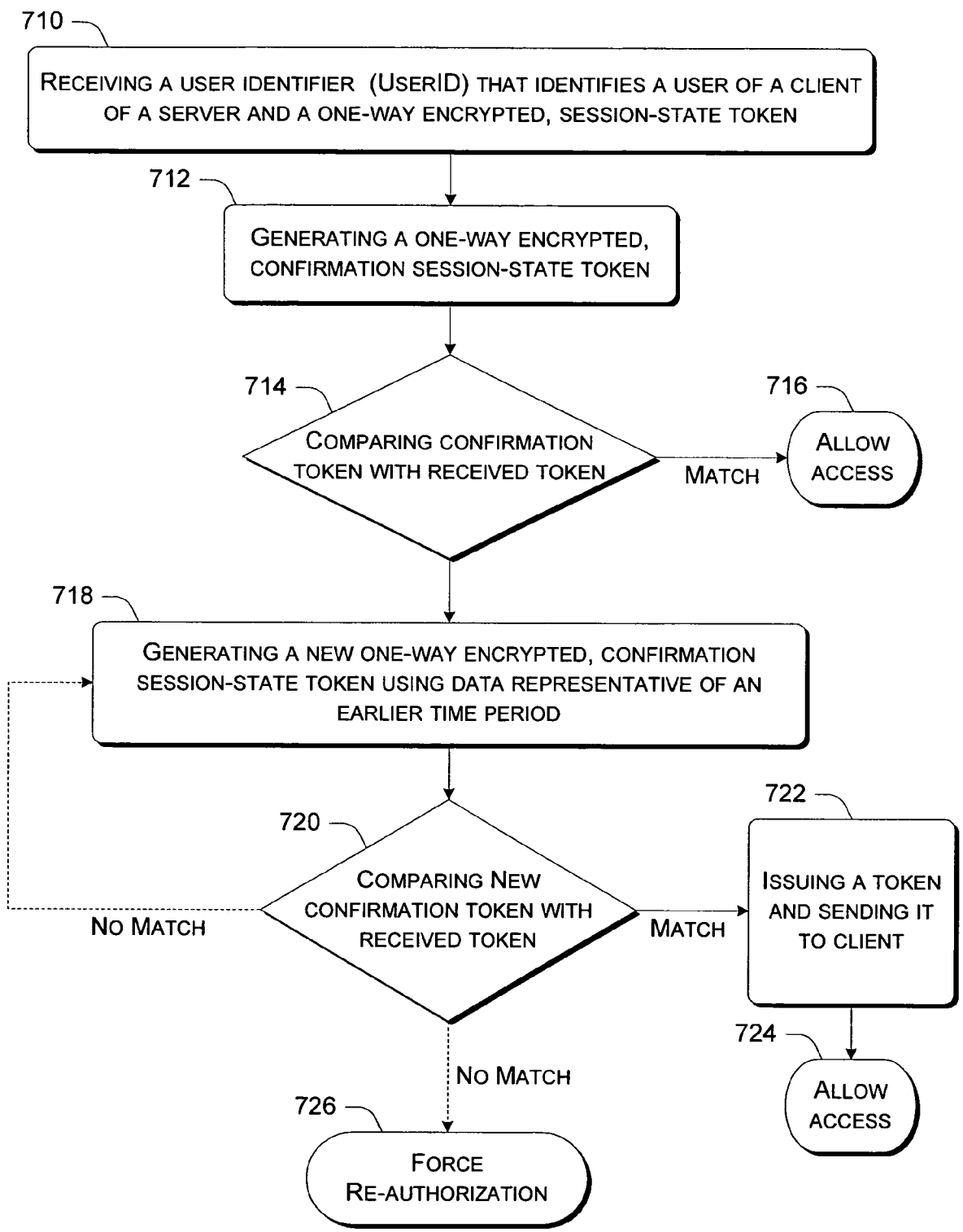
FIG. 7 is a flowchart showing exemplary steps implementing the session-state manager.

FIG. 7 shows the steps of the exemplary implementation of the session-state manager that may be broadly called "token verification." At 710, a Web server (which can be a single Web server as shown at 130 in FIG. 1 or a Web farm as shown at 240 of FIG. 2) receives a user identifier (UserID) and a one-way encrypted, session-state token with each transmission from the client.

At 712, the Web server generates a one-way encrypted, confirmation session-state token. At 714, the Web server compares the confirmation token with the token that it received in block 710.

If the two tokens match, then access to the requested Web page of the server is allowed at 716. The two tokens will match if:
  the same UserID is used to generated both; and
  both were generated during the same incremental time block.

That time block would be the one that was current when the confirmation token is generated. As previously discussed, these incremental time blocks are called "time buckets."

If the tokens do not match, then, at 718, the Web server generates a new one-way encrypted, confirmation session-state token while simulating that this token generation is taking place at an earlier period of time. This can be simulated by using data that identifies an earlier time bucket.

At 720, the Web server compares the new confirmation token with the received token. If they match, then a new token is issued and sent to the client at 722. Issuing a new token can mean: specifying the most-recently-generated token as the new token to be sent to the client; or generating a new token to be sent to the client. After that, the user is allowed access the desired Web page or other resources at 724.

If the new confirmation token and the received token do not match, then one of two things may happen. Either the user will be forced to logon again at 726 or the process will loop back to block 718 where a newer confirmation token is generated. A "newer" confirmation token is one that was more recently generated than another confirmation token generated in the loop. Likewise, the "newest" confirmation token is the one that was most recently generated of those generated in the loop.

The process will perform this loop a specified number of times. Each iteration of block 718 generates a newer confirmation token based upon a time bucket earlier than the one used during the previous iteration. Each iteration of block 720 compares the newest (i.e., most-recently-generated) confirmation token with the received token.

If no match is made after looping a specified number of times, then the user is forced to logon again at 726. This looping allows the current session of a user to stay valid for up to X number of complete time buckets, where X is the specified number of times that the steps are executed in the loop.

In the exemplary embodiment of the session-state manager, a Web page checks to see if the user has logged in. The ASP of the Web page calls CheckToken( ). It passes in the input (e.g., UserID) and the token received from the user.

If the user's session has expired or if the token is invalid, the component returns a "timeout" indicator, which forces the user to logon again. Otherwise, it returns the token, indicating that the session is valid. Periodically, the CheckToken( ) function will return a refreshed token so that the session will expire only if the user is inactive for a specified number of time buckets.

An exemplary section pseudocode for the CheckToken function is below (the pseudocode is similar to C++ code for a COM implementation):

```
STDMETHODIMP    CSessMan::CheckToken(BSTR    root,    BSTR    token,    BSTR
*pbstrIsOK)
{
    HRESULT hr;
    char logRoot[255];
    char logToken[255];
    char logTmpRoot[255];
    char logTmpRootReturn[255];
    wcstombs(logToken, token, 255);
    CComBSTR tmpRoot(root);
    tmpRoot.Append("");
    if (tmpRoot.Length( ) == 0) {
        CComVariant vtOut("Timeout");
        hr = VariantChangeType(&vtOut, &vtOut, 0, VT_BSTR);
```

-continued

```
                    if (FAILED(hr)) return hr;
                    *pbstrIsOK = ::SysAllocString(V_BSTR(&vtOut));
                    return S_OK;
            }
            wcstombs(logRoot, tmpRoot.m_str, 255);
            char tmpOut[33];
            tmpRoot.Append(m_szSecretSeed);
            tmpRoot.Append(GetTimeBucket( ));
            wcstombs(logTmpRoot, tmpRoot.m_str, 255);
            CalcHash((char *)tmpRoot.m_str, tmpOut, ((int)(tmpRoot.Length( )) + 1)
* 2);
            tmpOut[m_HashLength] = 0;
            strcpy(logTmpRootReturn, tmpOut);
            if (CComBSTR(token) == CComBSTR(tmpOut)){
                    CComVariant vtOut(tmpOut);
                    hr = VariantChangeType(&vtOut, &vtOut, 0, VT_BSTR);
                    if (FAILED(hr)) return hr;
                    *pbstrIsOK = ::SysAllocString(V_BSTR(&vtOut));
                    return S_OK;
            }
            else{
                    char tmpOut2[33];
                    CComBSTR tmpRoot2(root);
                    tmpRoot2.Append(m_szSecretSeed);
                    tmpRoot2.Append(GetPrevTimeBucket( ));
                    CalcHash((char          *)tmpRoot2.m_str,         tmpOut2,
((int)(tmpRoot2.Length( )) + 1) * 2);
                    tmpOut2[m_HashLength] = 0;
                    if (CComBSTR(token) == CComBSTR(tmpOut2)){
                            CComVariant vtOut(tmpOut);
                            hr = VariantChangeType(&vtOut, &vtOut, 0, VT_BSTR);
                            if (FAILED(hr)) return hr;
                            *pbstrIsOK = ::SysAllocString(V_BSTR(&vtOut));
                            return S_OK;
                    }
                    else{
                            CComVariant vtOut("Timeout");
                            hr = VariantChangeType(&vtOut, &vtOut, 0, VT_BSTR);
                            if (FAILED(hr)) return hr;
                            *pbstrIsOK = ::SysAllocString(V_BSTR(&vtOut));
                            return S_OK;
                    }
            }
    }
}
```

TimeID Verification

Figure 8:
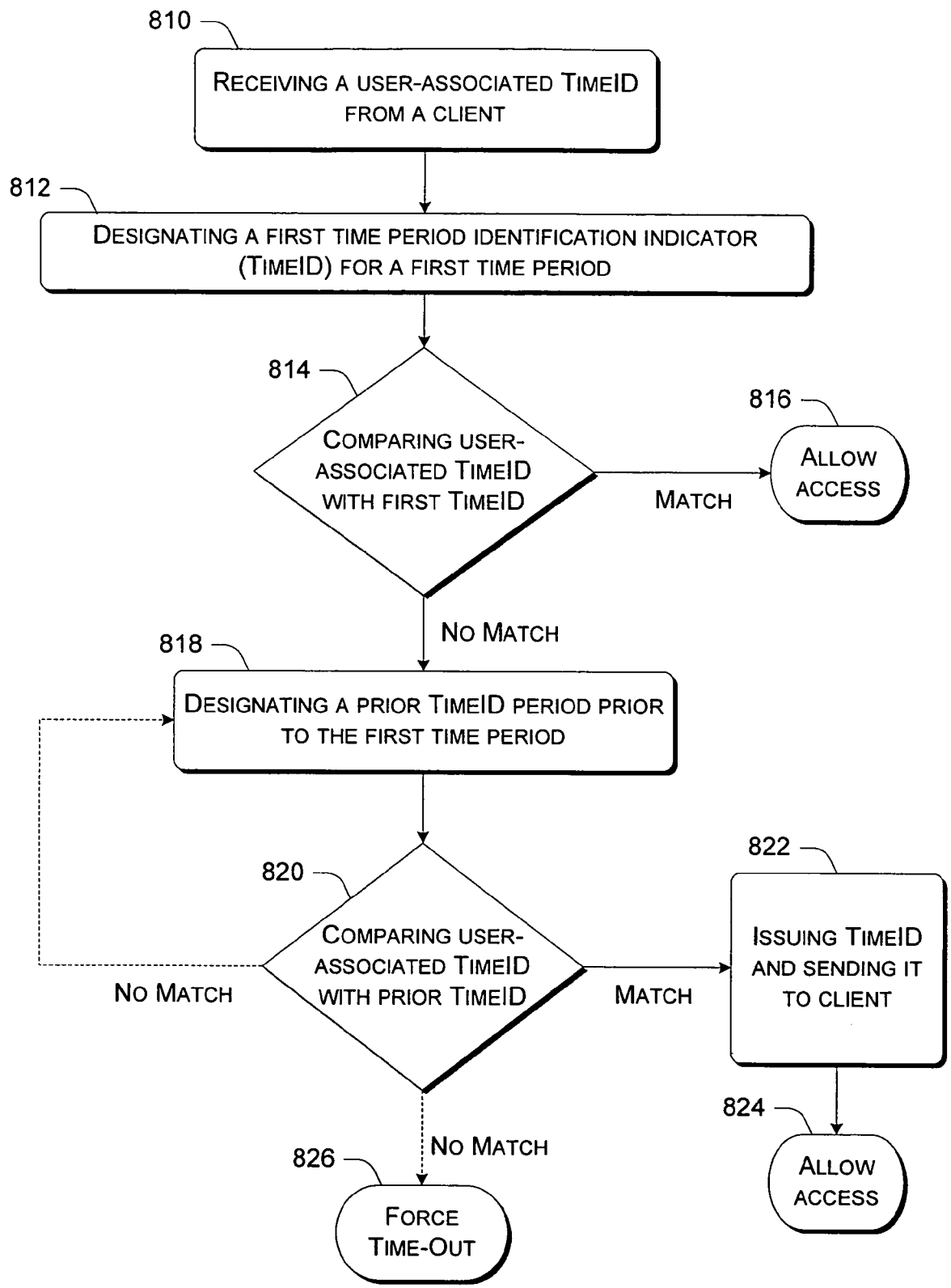
FIG. 8 is a flowchart showing exemplary steps implementing the session-state manager.

FIG. 8 shows the steps of an exemplary alternative embodiment of the session-state manager that may be broadly called "TimeID verification." Like the above-described embodiments of the session-state manager, this alternative exemplary embodiment is implemented by a Web server.

This exemplary embodiment may use the tokens described above, but not necessarily in the same way. Although it may use a token that is generated by an encryption scheme, it may also employ a token that is a plain numerical value corresponding to a specific time bucket. In addition, this exemplary implementation does not necessarily track user identification and logon validation information.

A Web server (which can be a single Web server as shown at 130 in FIG. 1 or a Web farm as shown at 240 of FIG. 2) generates a TimeID when the user initiates a session. This TimeID identifies the time bucket of the current time. The server sends that TimeID to the user via the client. Subsequently, the user sends that TimeID to the server.

FIG. 8 shows, at 810, a Web server receiving the TimeID that the user sent. That TimeID is now called the "user-associated TimeID". At 812, the Web server designates a first TimeID that identifies a first time bucket. At 814, the Web server compares the first TimeID with the user-associated TimeID that it received in block 810.

If the two TimeIDs match, then access to the requested Web page of the server is allowed at 816. The two TimeIDs will match if both identify the same time bucket.

If the TimeIDs do not match, then, at 818, the Web server designates a prior TimeID identifying a time bucket before the first time bucket. At 820, the Web server compares the prior TimeID with the received TimeID. If they match, then the first TimeID (for the first time bucket) is sent to the client at 822. After that, the user is allowed access at 824.

If the TimeIDs do not match, then, at 818, the Web server designates a new prior TimeID while simulating that this TimeID designation takes place at an earlier time bucket. This can be simulated by using data that identifies an earlier time bucket.

At 820, the Web server compares the new prior TimeID with the user-associated TimeID. If they match, then a new TimeID is issued and sent to the client at 822.

Issuing a new, user-associated TimeID can mean: specifying the most-recently-designated TimeID as the new user-associated TimeID to be sent to the client; or designating a new user-associated TimeID to be sent to the client. After that, the user is allowed access the desired Web page or other resources at 824.

If the new prior TimeID and the user-associated TimeID do not match, then one of two things may happen. Either the user will be forced to logon again at 826 or the process will loop back to block 818 where a newer prior TimeID is generated.

The process will perform this loop a specified number of times. Each iteration of block 818 generates a newer prior TimeID based upon a time bucket earlier than the one used during the previous iteration. Each iteration of block 820 compares the newest (i.e., most-recently-designated) prior TimeID with the received TimeID.

If no match is made after looping a specified number of times, then the user is forced to logon again at 826. This looping allows the current session of a user to stay valid for up to X number of complete time buckets, where X is the specified number of times that the steps are executed in the loop.

In this exemplary alternative embodiment of the session-state manager, a Web page checks to see if the user has logged in. These pages will typically be the pages having limited-access information or other recourses. The ASP calls function to check the TimeID. It passes in the seed (e.g., UserID) and the TimeID received from the user. If the user's session has expired or if the TimeID is invalid, the component returns a "timeout" indicator, which forces the user to logon again. Otherwise, it returns the TimeID, indicating that the session is valid. Periodically, the TimeID-checking function will return a refreshed TimeID so that the session will expire only if the user is inactive for a specified number of time buckets.

Again, this describes an alternative embodiment of the session-state manager. This alternative embodiment employs non-encrypted tokens that tracks only logon expiration. This alternative embodiment does not necessarily have a high degree of security and it does not track user identification and logon validation.

CONCLUSION

The main exemplary implementation described above and shown in FIGS. 1-7 uses a one-way encryption scheme. This provides a high degree of security and reliability.

In a one-way encryption scheme, the door is locked and sealed shut. If an interloper successfully unlocks and unseals the door, she would find only a key to a safe-deposit box. To acquire the contents of the box, the interloper must select the right bank, break into that bank, and find the box that the key fits.

Using this analogy, the encoded token is the key to the safe-deposit box; the encrypted token is the key to and seal of the door behind which is placed the key; and Web server is the bank housing the safe-deposit boxes including the one box that the encoded token "safe-deposit" box unlocks. Inside, that box is session-state information of the user.

However, there is one more level of security provided by the exemplary implementation of the session-state manager. The Logon expiration of the exemplary session-state manager is analogous to the bank changing the lock on the safe deposit box if they haven't heard from their customer for a while.

Although the session-state manager has been described in language specific to structural features and/or methodological steps, it is to be understood that the session-state manager defined in the appended claims is not necessarily limited to the specific features or steps described. Rather, the specific features and steps are disclosed as preferred forms of implementing the claimed session-state manager.

The invention claimed is:

1. A computer-readable medium having computer-executable instructions for performing steps comprising:

receiving a one-way encrypted, session-state token from a client, wherein the token incorporates a representation of session state of a client;

generating a one-way encrypted, confirmation session-state token; and comparing the confirmation token with the received token;

wherein the generating step comprises forming a confirmation token that incorporates a representation of an incremental time block, if confirmation and received tokens fail to match;

generating a new one-way encrypted, confirmation session-state token, wherein the new confirmation token incorporates a representation of a previous incremental time block; and comparing the new confirmation token with the received token;

wherein the new-confirmation-token generating step comprises forming a confirmation token that incorporates a representation of an incremental time block, if confirmation and received tokens fail to match, and repeating the steps of new-confirmation-token generating and comparing the new and received tokens, wherein each subsequent reiteration of such steps employs a representation of a previous incremental time block that is previous of a previous reiteration of the same steps, for a specified number of times or until compared tokens match.

2. A session state management system comprising:

a means for receiving a one-way encrypted, session-state token from a client, wherein the token incorporates a representation of session state of a client;

a means for generating a one-way encrypted, confirmation session-state token; and a means for comparing the confirmation token with the received token;

wherein the means for generating comprises a means for forming a confirmation token that incorporates a representation of an incremental time block, if confirmation and received tokens fail to match;

a means for generating a new one-way encrypted, confirmation session-state token, wherein the new confirmation token incorporates a representation of a previous incremental time block; and a means for comparing the new confirmation token with the received token;

wherein the new-confirmation-token means for generating comprises a means for forming a confirmation token that incorporates a representation of an incremental time block, if confirmation and received tokens fail to match, and a means for repeating the new-confirmation-token means for generating and means for comparing the new and received tokens, wherein each subsequent reiteration of such means employs a representation of a previous incremental time block that is previous of a previous reiteration of the same means, for a specified number of times or until compared tokens match.

3. A computer-readable storage medium having computer-executable instructions for performing steps comprising:

(A) receiving a one-way encrypted, session-state token from a client;

(B) generating a one-way encrypted, confirmation session-state token, wherein the confirmation token incorporates a representation of a current incremental time block;

(C) comparing the confirmation token with the received token;

(D) if the confirmation token and the received token match, (1) issuing a one-way encrypted, replacement session-state token, wherein the replacement token incorporates a representation of a current incremental time block;
(2) sending the replacement token to the client.
if the confirmation token and the received token fail to match,
(3) generating a new one-way encrypted, confirmation session-state token using the one-way encryption scheme of the encryption step, wherein the new confirmation token incorporates a representation of a previous incremental time block;
(4) comparing the new confirmation token with the received token;
(5) if the new confirmation and received tokens fail to match, then further comprising:
  (i) repeating the steps of new-confirmation-token generating and comparing the new and received tokens, wherein each subsequent reiteration of such steps employs a representation of a previous incremental time block that is previous of a previous reiteration of the same steps, for a specified number of times;
  (ii) if, during the repeating step, the confirmation token matches the received token,
    (a) issuing a one-way encrypted, replacement session-state token, wherein the replacement token incorporates a representation of a current incremental time block;
    (b) sending the replacement token to the client.

4. A session state management system comprising:
(A) a means for receiving a one-way encrypted, session-state token from a client;
(B) a means for generating a one-way encrypted, confirmation session-state token, wherein the confirmation token incorporates a representation of a current incremental time block;
(C) a means for comparing the confirmation token with the received token;
(D) if the confirmation token and the received token match,
  (1) a means for issuing a one-way encrypted, replacement session-state token, wherein the replacement token incorporates a representation of a current incremental time block;
  (2) a means for sending the replacement token to the client. if the confirmation token and the received token fail to match,
  (3) a means for generating a new one-way encrypted, confirmation session-state token using the one-way encryption scheme of the encryption step, wherein the new confirmation token incorporates a representation of a previous incremental time block;
  (4) a means for comparing the new confirmation token with the received token;
  (5) if the new confirmation and received tokens fail to match, then further comprising:
    (i) a means for repeating the steps of new-confirmation-token generating and comparing the new and received tokens, wherein each subsequent reiteration of such steps employs a representation of a previous incremental time block that is previous of a previous reiteration of the same steps, for a specified number of times;
    (ii) if, during the repeating step, the confirmation token matches the received token,
      (a) a means for issuing a one-way encrypted, replacement session-state token, wherein the replacement token incorporates a representation of a current incremental time block;
      (b) a means for sending the replacement token to the client.

5. A computer-readable storage medium having computer-executable instructions for performing steps comprising:
receiving a user-associated, encoded session-state token from a client, wherein the encoded token incorporates a representation of session-state of the user's session;
generating an encoded, confirmation session-state token;
comparing the received token with the confirmation token;
wherein the generating step comprises forming a confirmation token that incorporates a representation of a current incremental time block, if confirmation and received tokens fail to match, further comprising:
generating a new confirmation token using a representation of a incremental time block previous of the time block representation used for the previous generating step;
comparing the new confirmation token with the received token; and
if confirmation and received tokens fail to match, and
repeating the steps of generating a new confirmation token and comparing the new and received tokens, wherein each subsequent reiteration of these steps uses a representation of a previous incremental time block that is a previous reiteration of the same steps, for a specified number of times or until compared tokens match.

6. A session state management system comprising:
a means for receiving a user-associated, encoded session-state token from a client, wherein the encoded token incorporates a representation of session-state of the user's session;
a means for generating an encoded, confirmation session-state token;
a means for comparing the received token with the confirmation token;
wherein the means for generating comprises a means for forming a confirmation token that incorporates a representation of a current incremental time block, if confirmation and received tokens fail to match, further comprising:
a means for generating a new confirmation token using a representation of a incremental time block previous of the time block representation used for the previous means for generating;
a means for comparing the new confirmation token with the received token; and
if confirmation and received tokens fail to match, and
a means for repeating the steps of means for generating a new confirmation token and means for comparing the new and received tokens, wherein each subsequent reiteration of these means uses a representation of a previous incremental time block that is a previous reiteration of the same means, for a specified number of times or until compared tokens match.

* * * * *